United States Patent Office 3,220,973
Patented Nov. 30, 1965

3,220,973
CROSS-LINKED POLYCARBONATE RESINOUS COMPOSITIONS
Eugene P. Goldberg, Pittsfield, Mass., assignor to General Electric Company, a corporation of New York
No Drawing. Filed Aug. 22, 1957, Ser. No. 679,742
8 Claims. (Cl. 260—47)

This invention relates to polycarbonate resins having desirable physical, chemical and electrical properties and to their preparation. More particularly it relates to polycarbonate compositions containing as a constituent part thereof dihydric phenol derived carbonate units in which the carbonate group is directly attached to a nuclear carbon atom i.e. to a carbon of an aromatic ring, said polycarbonate compositions being cross-linked by means of a material selected from the group consisting of polyols, aminoalcohols and polyamines.

Various types of polycarbonate resins are known, among which are those prepared by the vinyl polymerization of unsaturated carbonate esters such as allyl carbonates, etc. from the ester interchange of carbonate esters with glycols and by the reaction of dihydroxymonoaryl compounds such as hydroquinone and resorcinol with phosgene or with carbonate esters. Such polycarbonate materials are of limited usefulness because they do not have a desirable combination of physical properties. More useful are those polycarbonate resins which contain carbonate units derived from dihydric phenols as well as copolymers of such carbonate resins with other materials. While such compositions are characterized by good physical, chemical and electrical properties and have a relatively high softening point, as well as desirable tensile strength, impact strength and even rubber-like elastic properties in some instances, they are quite readily soluble in certain organic solvents, such as dioxane, chloroform, methylene chloride and chlorobenzene, among others, so that their final use is limited to those applications in which they do not come in contact with such organic solvents. Furthermore, while their heat distortion temperatures are generally of the order of about 150° C. which is high for a thermoplastic material, the fact remains that they are thermoplastic and as such are not suitable for use in electrical equipment and the like where temperatures in excess of 150° C. are encountered.

Briefly stated, the compositions of this invention comprise carbonate polymers or resins containing carbonate structural units derived from (1) dihydric phenols and (2) aliphatic compounds having a functionality of three or more selected from the group consisting of polyols, amino alcohols, polyamines and mixtures thereof, cross-linking being facilitated by the latter materials. Generally speaking the products are obtained by reacting a dihydric phenol material, a carbonate precursor material and the material which also serves as a cross-linker. The product is curable by heating at a temperature of from about 180° C. to 300° C.

Any dihydric phenol compound is useful in the practice of the invention such dihydric phenol being defined as a mono or polynuclear phenol type material in which the hydric or hydroxy groups are attached to nuclear carbons of aromatic rings. The dihydric phenol compounds used in connection with the invention can typically be represented by the general formula:

(I)
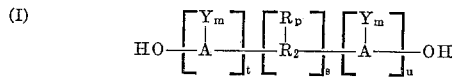

where R is hydrogen or a monovalent hydrocarbon radical, for example, alkyl radicals (e.g., methyl, ethyl, propyl, isopropyl, butyl, decyl, etc.), aryl radicals (e.g., phenyl, naphthyl, bisphenyl, aralkyl radicals (e.g., benzyl, ethylphenyl, butylphenyl, etc.), cycloaliphatic radicals (e.g., cyclopentyl, cyclohexyl, etc.), as well as monovalent hydrocarbon radicals containing inert substituents such as halogen (chlorine, bromine, fluorine, etc.). It will be understood that where more than one R is used, they may be the same or different. $R_2$ is selected from the group consisting of an alkylene and alkylidene residue, such as methylene, ethylene, propylene, propylidene, isopropylidene, butylene, butylidene, amylene, isoamylene, isoamylidene, etc. $R_2$ can also be a polyoxy linkage such as polyethoxy, polypropoxy, polythioethoxy, polybutoxy, polyphenylethoxy, a polyorganosiloxy linkage for example, polydimethylsiloxy, polydiphenylsiloxy, polymethylphenylsiloxy, etc., or an ether linkage, a sulfur-containing linkage such as sulfide, sulfoxide, sulfone, a carbonyl linkage, a tertiary nitrogen or a silicon-containing linkage such as silane or siloxy. $R_2$ can also consist of two or more alkylene or alkylidene groups, such as above, separated by the residue of an aromatic nucleus, a tertiary amino radical, an ether radical or by a carbonyl radical, a silane or siloxy radical or by a sulfur-containing radical such as sulfide, sulfoxide, sulfone, etc. Other groupings which can be represented by $R_2$ will occur to those skilled in the art. A is the residue of an aromatic nucleus, Y is a substituent selected from the group consisting of (a) inorganic atoms, (b) inorganic radicals, and (c) organic radicals, (a), (b) and (c) being inert to and unaffected by the reactants and by the reaction conditions, $m$ is a whole number including zero to a maximum equivalent to the number of replaceable nuclear hydrogens substituted on the aromatic hydrocarbon residue, $p$ is a whole number including zero to a maximum determined by the number of replaceable hydrogens on $R_2$, $s$ ranges from zero to 1, $t$ and $u$ are whole numbers including zero. When $s$ is zero, however, either $t$ or $u$ may be zero and not both.

In the dihydric phenol compound, the substituent Y may be the same or different as may be the R. Monovalent hydrocarbon radicals designated by R can be the same as those in reference to the compound of Formula I above, as may be those represented by $R_1$. Among the substituents represented by Y are halogen (e.g., chlorine, bromine, fluorine, etc.) or oxy radicals of the formula OW, where W is a monovalent hydrocarbon radical similar to R, or monovalent hydrocarbon radicals of the type represented by R. Other inert substituents such as a nitrogroup can be represented by Y. Where $s$ is zero in Formula I, the aromatic nuclei are directly joined with no intervening alkylene or alkylidene or other bridge. The positions of the hydroxyl groups and Y on the aromatic nuclear residues A can be varied in the ortho, meta, or para positions and the groupings can be in a vicinal, asymmetrical or symmetrical relationship, where two or more of the nuclearly bonded hydrogens of the aromatic hydrocarbon residue are substituted with Y and the hydroxyl group. Examples of dihydric phenol compounds that may be employed in this invention include 2,2-bis-(4-hydroxyphenyl)-propane (bisphenol-A);
2,4'-dihydroxydiphenyl-methane;
bis-(2-hydroxyphenyl)-methane;
bis-(4-hydroxyphenyl-methane;
bis-(4-hydroxy-5-nitrophenyl)-methane;
bis-(4-hydroxy-2,6-dimethyl-3-methoxyphenyl)-methane;
1,1-bis-(4-hydroxyphenyl)-ethane;
1,2-bis(4-hydroxyphenyl)-ethane;
1,1-bis-(4-hydroxy-2-chlorophenyl)-ethane;
1,1-bis-(2,5-dimethyl-4-hydroxyphenyl)-ethane;
1,3-bis-(3-methyl-4-hydroxyphenyl)-propane;
2,2-bis-(3-phenyl-4-hydroxyphenyl)-propane;
2,2-bis-(3-isopropyl-4-hydroxyphenyl)-propane;
2,2-bis-(4-hydroxynaphthyl)-propane;
2,2-bis-(4-hydroxyphenyl)-pentane;

3,3-bis-(4-hydroxyphenyl)-pentane;
2,2-bis-(4-hydroxyphenyl)-heptane;
bis-(4-hydroxyphenyl)-phenyl methane;
bis-(4-hydroxyphenyl)-cyclohexyl methane;
1,2-bis-(4-hydroxyphenyl)-1,2-bis-(phenyl) ethane;
2,2-bis-(4-hydroxyphenyl)-1,3-bis-(phenyl) propane;
2,2-bis-(4-hydroxyphenyl)-1-phenyl propane; and the like.

Also included are dihydroxybenzenes typified by hydroquinone and resorcinol, dihydroxy diphelys such as 4,4'-dihydroxydiphenyl; 2,2'-dihydroxydiphenyl; 2,4'-dihydroxydiphenyl; dihydroxynaphthalenes such as 2,6-dihydroxynaphthalene etc. Dihydroxy aryl sulfones such as those set forth in application Serial No. 613,817 filed October 4, 1956, assigned to the same assignee as this invention are also useful, e.g. bis-(p-hydroxyphenyl)-sulfone; 2,4'-dihydroxydiphenyl sulfone; 5'-chloro-2,4'-dihydroxydiphenyl sulfone; 5'-chloro-2',4-dihydroxydiphenyl sulfone; 3'-chloro-4,4'-dihydroxydiphenyl sulfone; bis (4-hydroxy phenyl) diphenyl disulfone, etc. The preparation of these and other useful sulfones is described in Patent 2,288,282—Huissmann. Dihydric aryl polysulfones as well as sulfones substituted with halogen, nitrogen, alkyl radicals etc. are also useful. Dihydroxy aromatic ethers such as those set forth in application Serial No. 598,768 filed July 19, 1955, assigned to the same assignee as this invention are also useful. Methods of preparing such materials are found in "Chemical Reviews" 38, 414–417 (1946) and Patent 2,739,171—Linn. Exemplary of such dihydroxy aromatic ethers are p,p'-dihydroxydiphenyl ether; p,p'-dihydroxytriphenyl ether; the 4,3'-, 4,2'-, 3,3'-, 2,2'- 2,3'-, etc, dihydroxydiphenyl ethers; 4,4'-dihydroxy-2,6-dimethyldiphenyl ether; 4,4'-dihydroxy-2,5-dimethyldiphenyl ether; 4,4'-dihydroxy-3,3'-diisobutyldiphenyl ether; 4,4'-dihydroxy-3,3'-diisopropyldiphenyl ether; 4,4'-dihydroxy-3,2'-dinitrodiphenyl ether; 4,4'-dihydroxy-3,3'-dichlorodiphenyl ether; 4,4'-dihydroxy-3,3'-difluorodiphenyl ether; 4,4'-dihydroxy-2,3'-dibromodiphenyl ether; 4,4'-dihydroxydinaphthyl ether; 4,4'-dihydroxy 3,3'-dichlorodinaphthyl ether; 2,4-dihydroxytetraphenyl ether; 4,4'-dihydroxypentaphenyl ether; 4,4'-dihydroxy-2,6-dimethoxydiphenyl ether; 4,4'-dihydroxy-2,5-diethoxydiphenyl ether, etc. Mixtures of the dihydric phenols can also be employed and where dihydric phenol is mentioned herein, mixtures of such materials are considered to be included.

Any carbonate precursor may be used including diaryl carbonates, phosgene and phosgene like materials.

The diaryl carbonates useful in this connection can be represented by the general formula:

(II) 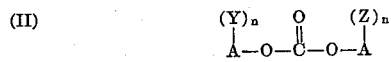

where A is an organic residue in the same sense as in Formula II, Z is an inorganic or organic radical in the same sense as Y of Formula II, and $n$ is an integer. Examples of carbonate esters comprise symmetrical carbonates, for example, diphenyl carbonate, di-(halo-phenyl) carbonates, e.g., di-(chlorophenyl) carbonate, di-(bromophenyl) carbonate; di-(polyhalophenyl) carbonates, e.g. di-(trichlorophenyl) carbonate, di-(tribromophenyl) carbonate, etc.; di-(alkylphenyl) carbonates, e.g. di-(tolyl) carbonate, etc., di-(naphthyl) carbonate, di-(chloronaphthyl) carbonate, etc.; chlorophenyl chloronaphthyl carbonate, trichlorophenyl chlorotolyl carbonate, etc. Mixtures of the foregoing carbonate esters can also be employed.

These diaryl carbonates can be prepared by the methods described in A. F. Holliman et al., Rec. Trav. Chem. 36, 271 (1916) and Copisarow, Chem. Soc. (Brit.) 1929, 251, both of whom disclose preparing dicresyl carbonates by treating the alkali metal salts of p-cresol with phosgene, and U.S. Patent 2,362,865—Tryon et al., which discloses preparing diphenyl, ditoyl and dinaphthyl carbonates by passing phosgene through a column of the phenol in the presence of a catalyst, etc.

Phosgene can also be used as a carbonate precursor. Suitable phosgene-like dibasic acid halides, in addition to phosgene can be used, including, for example, dibromo and diiodocarbonyls as well as the bishaloformates of dihydric phenols (e.g. bischloroformates of hydroquinone, bisphenyl-A etc.) or glycols (e.g. bischloroformates of ethylene glycol, neopentyl glycol, polyethylene glycol etc.). Other carbonate precursors will occur to those skilled in the art.

The cross-linking materials which are useful in connection with this invention are well known, being selected from the group consisting of polyols, amino alcohols and polyamines and mixtures thereof and having a functionality of three or greater. In considering functionality it is understood that amino hydrogens as well as hydroxyl hydrogens contribute a functionality of one each. The organic radical of the polyol can be selected from the group consisting of alkylene and alkylidene residue such as methylene, ethylene, propylene, propylidene, isopropylidene, butylene, butylidene, isobutylidene, amylene, isoamylene, amylidene, isoamplidene, etc. The organic radical can also contain a silane or siloxy linkage, or a polyalkoxy linkage such as polyethoxy, polypropoxy, polythioethoxy, etc. The organic radical can also consist of two or more alkylene or alkylidene groups such as above, separated by the residue of an aromatic nucleus, by a tertiary amino radical, by an ether radical, by a carbonyl radical, by a silicon containing radical, or by a sulfur-containing radical such as sulfide, sulfoxide, sulfone, etc. Typical of such polyols are glycerine, trimethylolpropane, pentaerythritol, 1,2,4-butanetriol, trimethylolethane, 1,2,6-hexanetriol, 1,3,6-hexanetriol, 1,2,5-pentanetriol, sorbitol, etc. The aminoalcohols useful in connection with the invention are also well known and the organic radical or radicals thereof may be the same as those of the polyols. Typical of such aminoalcohols are triethanolamine, diethanolamine, trimethanolamine, tripropanolamine, tributanolamine, ethanolamine, propanolamine, butanolamine, hexanolamine, dipropanolamine, dimethanolamine and dibutanolamine. In general, any aliphatic aminoalcohol having a functionality of three or more may be employed. The polyamines which are useful in connection with the invention are those which contain at least three available amino hydrogens and in which any additional group necessary to satisfy the valences of the nitrogen atom are hydrogen or an aliphatic radical, for example, methyl, ethyl, propyl, isopropyl, butyl, decyl, etc. The organic radical of the polyamine may be the same as that of the above polyols and aminoalcohols. Typical of the polyamines which are useful in this respect are the aliphatic diamines, such as hexamethylenediamine, pentamethylenediamine, octamethylenediamine, decamethylenediamine and butylenediamines.

The heat-convertible resins are preferably prepared using a carbonate ester, the materials being reacted at temperatures of from about 150° C. to 300° C. or higher for times varying from 1 to 15 or more hours. Under such conditions, a reaction occurs between the carbonate ester and the active hydrogen compounds. The reaction is advantageously carried out at reduced pressures of around 10 to 100 mm. of mercury preferably in an inert atmosphere such as of nitrogen, argon, krypton, etc. to prevent undesirable oxidative effects, especially where higher reaction temperatures are used under moderate subatmospheric pressures. Heating under vacuum after the reaction is substantially complete (vacuum cooking), for example, at from 150° C. to 300° C. at 0.01 to 5 to 10 mm. of mercury for short periods of time tends to increase the molecular weight of the carbonate polymer; however the vacuum cook must be halted short of gelation.

Although the reaction can be carried out in the absence of a catalyst, one may, if desired, use the usual ester exchange catalysts, for instance, metallic lithium, potassium, calcium, beryllium, magnesium, zinc cadmium, aluminum, chromium, molybdenum, iron, cobalt, nickel, silver, gold, tin, antimony, lead barium strontium, platinum, palladium, etc. and compounds thereof such as alcoholates, oxides, carbonates, acetates, hydrides, etc. Additional catalysts and variations in the ester exchange methods are discussed in Groggins "Unit Processes in Organic Synthesis" (4th Edition, McGraw-Hill Book Company, 1952), pages 616 to 620. The amount of such catalyst is usually quite small and is of the order of 0.001 to 0.1% by weight, based on the total weight of the reactants.

While I do not prefer this method the reaction may also be carried out using as the carbonate precursor a phosgene or a phosgene-like dibasic acid halide in an organic basic material such as a tertiary amine (e.g., pyridine, dimethylaniline, quinoline, etc.). The base can be used undiluted or diluted with inert solvents, for example, hydrocarbons such as benzene, toluene, xylene, etc. and halocarbons such as chloroform, chlorobenzene, methylene chloride, etc. Tertiary amines are advantageous in that they serve to catalyze the reaction, are good solvents and act as acceptors for halogen acid given off during the reaction. Although the phosgene reaction can be carried out over a wide range of temperatures, for example, from below 0° C. to over 100° C., the reaction proceeds satisfactorily at 25° C. to 50° C. Since the reaction is exothermic, the rate of phosgene addition can be used to control the reaction temperature. Substantially, equimolar amounts of phosgene can be used, although an excess of up to 1.5 moles or more may be employed.

It will be seen that whether a carbonate ester or phosgene is used in the reaction, the dihydric phenol will produce a dihydric phenol carbonate structural unit which can typically be represented by the following general formula wherein the various letters have the same meaning as above:

(III)

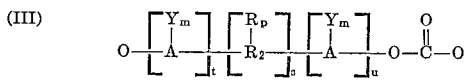

In addition to the materials described above, the materials described, for example, in copending application Serial No. 638,239 filed February 5, 1957, and issued as United States Patent 3,161,615 on December 15, 1964 assigned to the same assignee as this invention, are useful in connection herewith, the polyfunctional cross linking agents of this invention being added to the reaction mixtures. The above application is included by reference as a part of this application. Other materials which are susceptible to treatment according to this invention are combinations of dihydric phenols and sulfones as disclosed in copending application Serial No. 679,745 filed August 27, 1957, assigned to the assignee of the present invention combinations of dihydric phenols and aromatic ethers as disclosed in copending application Serial No. 679,746 filed August 22, 1957, assigned to the assignee of the present invention and combinations of dihydric phenols and dibasic acids as disclosed in copending application Serial No. 679,743 filed August 22, 1957, assigned to the assignee of the present invention. Here also the present polyfunctional cross linking materials are added to the reaction mixtures. All of the above copending applications are assigned to the same assignee as this invention and are incorporated herein by reference.

In general, from about 1 mole percent to about 75 mole percent of the cross-linking material, perfectly 5 mole percent to 30 mole percent, is used based upon the total functional group content, such as hydroxyl, or amino groups or mixtures thereof. The following examples will illustrate the practice of the invention.

*Example 1*

A mixture of 45.6 grams (0.20 mole) of bisphenol-A, 1.9 grams (0.02 mole) glycerine and 28.5 grams (0.18 mole) of diphenyl carbonate was heated at reduced pressure in a resin pot equipped with a stirrer, heating mantle and distilling head. Phenol distillation was carried out at 200° to 230° C. and at 20 to 2 mm. of mercury for about 3½ hours during which time an additional 8.6 grams (0.04 mole) of diphenyl carbonate was added to the reaction mixture. A sample taken at this time from the resin pot had a stroke cure of more than 3 minutes on a 180° hot plate. More diphenyl carbonate in the amount of 2.1 grams (0.01 mole) was added and the resin was cooked at 250° to 270° C. and at 1 to 4 mm. mercury for about 2 hours. The stroke cure for the resin thus prepared was from 30 to 70 seconds at 230° C. When cooled the viscous polymer solidified to a red-brown, brittle material which was completely soluble in dioxane. However, the stroke cured resin was insoluble in boiling dioxane.

Two grams of the above resin was dissolved in 18 cc. of dioxane, the 10% solution being redish-brown in color and viscous. Seven pieces of #12 bare copper wire cleaned with paper toweling were wound into spirals on a pencil and dip coated in the resin solution. The coated wires were then hung in a 225° C. air circulating oven for from 0.5 to 24 hours. All coatings so cured were insoluble in boiling dioxane. Those pieces which had been cured for less than one hour were particularly light in color and tough and flexible.

The procedure of the preceding paragraph was repeated except that a 5% dioxane solution of the resin was used instead of 10%, and the coatings were cured in a 180° air circulating oven for times varying from 0.25 to 7.5 hours. All coatings were cured as demonstrated by their insolubility in boiling dioxane. Coatings cured up to about 2 hours were particularly tough, flexible and had excellent adhesion to the base wire. Coatings cured for ¼, ½ and 1 hour did not peel or crack even when the wires were repeatedly twisted or bent.

Aluminum foil cup containing 0.5 gram of a 10% dioxane solution of the above resin was allowed to stand at room temperature in air for 1.5 hours to allow most of the solvent to evaporate, the cup being then placed in a 110° C. oven for 10 minutes and then in a 225° C. oven for 1.25 hours. The resultant film was clear, glossy, pale yellow, tough and quite flexible, and the film could not be stripped from the aluminum foil and did not crack or peel when repeatedly flexed. When placed in boiling dioxane, the coating did not dissolve.

*Example 2*

A resin pot equipped with stirrer, distilling head and heating mantle was charged with 68.4 grams (0.30 mole) of bisphenol-A, 4.1 grams (0.03 mole, 9.1 mole percent) pentaerythritol and 77.0 grams (0.36 mole) of diphenyl carbonate. The mixture was heated under reduced pressure and distillation of the phenol began at a pot temperature of about 218° C. and 15 mm. mercury pressure and continued for 15 minutes, during which time the temperature rose to about 230° C. The stroke cure time of a sample removed at this point was 15 seconds at 290° C. and from 90 to 120 seconds at 220° C. The polymer was then vacuum cooked an additional 5 minutes at 225° C. and 0.3 mm. of mercury and the viscous melt poured from the resin pot and cooled. The resin was soluble in dioxane, chloroform and tetrachloroethane and softened at about 85 to 100° C. When treated at 230° C. the resin cured in 50 to 60 seconds to insoluble, infusible material which would not dissolve in boiling chloroform.

*Example 3*

The procedure of Example 2 was repeated using 68.4 grams (0.30 mole) bisphenol-A, 3.2 grams (0.03 mole; 9.1 mole %) of diethanolamine and 73.8 grams (0.345 mole) of diphenyl carbonate. Phenol distillation began at 170° C. and 18 mm. of mercury and continued for 23 minutes during which time the temperature rose to 230° C. and the pressure reduced to 0.5 mm. This resin had a cure time of 150 seconds at 230° C. After an additional vacuum cook of 40 minutes at 260° C. to 280° C. and 0.5 to 1.0 mm. of mercury, the resin cure time was 60 seconds at 230° C. The cured resin was insoluble in boiling chloroform whereas the uncured material was soluble in dioxane, chloroform and tetrachloroethane.

Materials of this invention are useful in any applications where a tough, flexible coating or film is required for protecting or insulating a base material either as such or in varnish form. Thus, they are useful as insulating wire coatings, the polycarbonate material being dissolved in a suitable solvent such as chloroform and the like, through which the wire is passed, then heated to drive off the solvent and cure the resin, leaving a firm, flexible, high temperature resistant film on the wire. The materials are also useful for making molding compounds which may be used as such or filled with other material such as wood flour, silica in various forms, carbon black, divided metal, etc., for making molded parts of various shapes. Films of the material made in conventional manners are useful as wrapping or packaging materials, as liners, containers, covers, closures, sound recording and other tapes. Fibers formed from the materail are useful for yarn, thread, bristles, rope, etc. The products of the invention are further very useful as laminating adhesives and as adhesives for other applications. The compositions can also be alloyed with other resinous materials.

What I claim as new and dseire to secure by Letters Patent of the United States is:

1. A high molecular weight, cross-linked polycarbonate resin prepared by heating at a temperature above 180° C., a carbonate polymer of reactants consisting essentially of (1) a carbonate precursor selected from the class consisting of carbonate esters and carbonyl halides, (2) a dihydric phenol in which the hydroxyl groups are the sole reactive groups, and (3) a material selected from the class consisting of aliphatic polyols, aliphatic amino alcohols, aliphatic diamines and mixtures thereof, said material having a functionality of at least three provided by a hydroxyl and amino groups and being present in an amount ranging from 1 to 75 mole percent based on the total moles of dihydric phenol in said material.

2. A high molecular weight, cross-linked polycarbonate resin prepared by heating, at a temperature above about 180° C., a carbonate polymer of reactants consisting essentially of diphenyl carbonate, 2,2-bis-(4-hydroxyphenyl)-propane and from 1 to 75 mole percent of glycerine based on the total moles of 2,2-bis-(4-hydroxyphenyl)-propane and glycerine.

3. A high molecular weight, cross-linked polycarbonate resin prepared by heating at a temperature above about 180° C., a carbonate polymer of reactants consisting essentially of diphenyl carbonate, 2,2-bis-(4-hydroxyphenyl)-propane and from 1 to 75 mole percent of pentaerythritol based on the total moles of 2,2-bis-(4-hydroxyphenyl)-propane and pentaerythritol.

4. A high molecular weight, cross-linked polycarbonate resin prepared by heating at a temperature above about 180° C., a carbonate polymer of reactants consisting essentially of diphenyl carbonate, 2,2-bis-(4-hydroxyphenyl)-propane and from 1 to 75 mole percent of diethanolamine based on the total moles of 2,2-bis-(4-hydroxyphenyl)-propane and diethanolamine.

5. A high molecular weight, cross-linked polycarbonate resin prepared by heating, at a temperature above about 180° C., a carbonate polymer of reactants consisting essentially of diphenyl carbonate, 2,2-bis-(4-hydroxyphenyl)-propane and from 1 to 75 mole percent of triethanolamine based on the total moles of 2,2-bis-(4-hydroxyphenyl)-propane and triethanolamine.

6. A high molecular weight, cross-linked polycarbonate resin prepared by heating, at a temperature above about 180° C., a carbonate polymer of reactants consisting essentially of phosgene, 2,2,-bis-(4-hydroxyphenyli)-propane, and a material selected from the group consisting of aliphatic polyols, aliphatic aminoalcohols, aliphatic diamines and mixtures thereof, said material having a functionlity of at least three provided by hydroxyl and amino groups and being present in an amount ranging from 1 to 75 mole percent based on the total moles of 2,2-bis-(4-hydroxyphenyl)-propane and said material.

7. A heat-convertible, high molecular weight polycarbonate resin prepared by reacting, at a temperature of from about 0° C. to about 300° C., materials consisting essentially of (1) a dihydric phenol in which the hydroxyl groups are the sole reactive groups, (2) a carbonate precursor selected from the class consisting of carbonate esters and carbonyl halides, and (3) a material selected from the class consisting of aliphatic polyols, aliphatic aminoalcohols, aliphatic diamines and mixtures thereof, said material having a functionality of at least three provided by hydroxyl and amino groups and being present in an amount ranging from 1 to 75 mole percent based on the total moles of dihydric phenol and said material.

8. The method for preparing a high molecular weight, cross-linked polycarbonate resin which comprises heating at a temperature above about 180° C. a carbonate polymer of reactants consisting essentially of (1) a carbonate precursor selected from the class consisting of carbonate esters and carbonyl halides, (2) a dihydric phenol in which the dihydroxyl groups are the sole reactive groups, and (3) a material selected from the group consisting of aliphatic polyols, aliphatic aminoalcohols, aliphatic diamines, and mixtures thereof, said material having a functionality of at least three provided by hydroxyl and amino groups and being present in an amount ranging from 1 to 75 mole percent based on the total moles of said dihydric phenol and said material.

References Cited by the Examiner

UNITED STATES PATENTS 2,789,967  4/1957  Reynolds et al. _____ 260—47

FOREIGN PATENTS 17,166  10/1956  Germany.

OTHER REFERENCES

Schnell: Ang. Chem., 68, 633–640 (October 1956).

WILLIAM H. SHORT, *Primary Examiner.*

HAROLD N. BURSTEIN, MILTON STERMAN, PHILIP E. MANGAN, *Examiners.*

UNITED STATES PATENT OFFICE
CERTIFICATE OF CORRECTION

Patent No. 3,220,973                                   November 30, 1965

Eugene P. Goldberg

It is hereby certified that error appears in the above numbered patent requiring correction and that the said Letters Patent should read as corrected below.

Column 3, formula (II), for the left-hand portion of the formula reading $$(Y)_n \quad \text{read} \quad (Z)_n$$

Column 4, line 21, for "isoamplidene" read -- isoamylidene --;
column 5, line 2, for "lead barium" read -- lead, barium, --;
column 6, line 35, for "Aluminum" read -- An aluminum --;
column 7, line 27, for "dseire" read -- desire --.

Signed and sealed this 27th day of September 1966.

(SEAL)
Attest:

ERNEST W. SWIDER                               EDWARD J. BRENNER
Attesting Officer                             Commissioner of Patents